United States Patent [19]

Butts, Jr. et al.

[11] Patent Number: 5,426,741
[45] Date of Patent: Jun. 20, 1995

[54] BUS EVENT MONITOR

[75] Inventors: H. Bruce Butts, Jr., Redmond, Wash.; James N. Leahy, Boston; Richard B. Gillett, Jr., Westford, both of Mass.

[73] Assignee: Digital Equipment Corporation, Maynard, Mass.

[21] Appl. No.: 182,531

[22] Filed: Jan. 14, 1994

Related U.S. Application Data

[63] Continuation of Ser. No. 55,925, Apr. 30, 1993, abandoned, which is a continuation of Ser. No. 658,754, Feb. 20, 1991, abandoned.

[51] Int. Cl.⁶ ............................................. G06F 11/00
[52] U.S. Cl. ................................. 395/325; 364/DIG. 1; 364/229; 364/240; 364/241; 364/242.94; 364/260; 364/264; 364/264.2; 364/264.6; 364/265.1; 364/266; 364/251.3; 395/575
[58] Field of Search ............... 395/575, 325, 275, 425, 395/600

[56] References Cited

U.S. PATENT DOCUMENTS

| | | | |
|---|---|---|---|
| 4,085,448 | 4/1978 | Kogge | 395/325 |
| 4,206,346 | 6/1980 | Hirosawa et al. | 377/15 |
| 4,312,066 | 1/1982 | Bantz et al. | 371/16 |
| 4,367,525 | 1/1983 | Brown et al. | 395/250 |
| 4,435,759 | 3/1984 | Baum et al. | 395/250 |
| 4,484,269 | 11/1984 | Crain | 364/570 |
| 4,485,440 | 11/1984 | Duff et al. | 395/550 |
| 4,523,272 | 6/1985 | Fukunaga et al. | 395/325 |
| 4,590,550 | 5/1986 | Eilert et al. | 395/575 |
| 4,779,194 | 10/1988 | Jennings et al. | 395/650 |
| 4,821,178 | 4/1979 | Levin et al. | 395/575 |
| 4,835,736 | 5/1989 | Easterday | 395/325 |
| 4,837,748 | 1/1989 | Chung et al. | 365/236 |
| 4,857,774 | 8/1989 | El-Ayat et al. | 307/465 |
| 4,937,783 | 6/1990 | Lee | 395/275 |
| 4,949,252 | 8/1990 | Hange | 371/29.1 |
| 4,959,774 | 9/1990 | Davis | 395/575 |
| 4,963,768 | 10/1990 | Agrawal et al. | 307/465 |
| 5,010,482 | 4/1991 | Keller et al. | 395/275 |
| 5,050,104 | 9/1991 | Heyen et al. | 364/521 |
| 5,062,040 | 10/1991 | Bishop et al. | 395/650 |
| 5,089,957 | 2/1992 | Stultz et al. | 395/425 |
| 5,193,179 | 3/1993 | Laprade et al. | 395/575 |
| 5,223,827 | 6/1993 | Bell et al. | 340/825.06 |
| 5,226,156 | 7/1993 | MacLean, Jr. et al. | 395/600 |
| 5,237,684 | 8/1993 | Record et al. | 395/650 |

Primary Examiner—Jack B. Harvey
Assistant Examiner—Ayaz R. Sheikh
Attorney, Agent, or Firm—Arthur W. Fisher; Denis G. Maloney; Lindsay G. McGuinness

[57] ABSTRACT

A monitor for monitoring the occurrence of events on the bus (15) of a multiprocessor computer system. The bus event monitor (BEM) includes a dedicated BEM processor (23) and an event counter subsystem (25). During each bus cycle, the BEM (21) captures and interprets the packet of data being transmitted on the bus (15). If the packet represents an event designated by the user to be of interest, a counter associated with the type of packet that was captured and interpreted is incremented by one. More specifically, a field programmable gate array (FPGA), configured by the user, defines the type of events to be counted. When an event to be accounted occurs, the FPGA (33) produces a counter address that is based on the nature of the event, and causes an enable pulse to be generated. The address is applied to the active one of two event counter banks (39a, 39b) via an input crossbar switch (37a). The enable pulse enables the addressed event counter to be incremented by one. The inactive counter bank is available for reading by the dedicated BEM processor (23) while the counters of the active counter bank are being incremented. Preferably, each counter bank contains a large number of counters (e.g., 64K), each having a large capacity (e.g., 32 bit). As a result, a large number of different events can be counted over an indefinitely long period of time.

12 Claims, 6 Drawing Sheets

BUS EVENT MONITOR

This application is a continuation, of application Ser. No. 08/055,925 filed Apr. 30, 1993, which is a continuation application based on prior application Ser. No. 07/658,754, filed on Feb. 20, 1991 both of which are now abandoned.

TECHNICAL AREA

This invention relates to computer systems and, more particularly, to monitors for monitoring the events occurring on the bus of a computer system, particularly a multiprocessor computer system.

BACKGROUND OF THE INVENTION

In order to design and/or improve the design of computer systems, it is desirable to know how existing computer systems behave. One behavioral aspect of computer systems that is desirable to know is the nature of bus activity, i.e., the nature of events that occur on a computer bus as data is being processed. Bus event information has become more desirable as computers have increased in complexity. It is particularly desirable in the design of multiprocessor computer systems.

In the past, computer software and hardware engineers have used indirect and inaccurate means for determining how a computer system is behaving. Software monitoring of computer system operation has been accomplished by adding performance monitoring code to the software being run on a computer system. Adding performance monitoring code has the disadvantage of modifying the system under test, thereby obscuring the true behavior of the system. Additionally, the amount of data developed by performance monitoring code has often been small and incomplete because rigorous performance sampling creates unacceptable degradation of computer system operation.

Computer hardware monitoring has been accomplished by the use of standard electronic instruments such as logic analyzers and laboratory counters. Unfortunately, neither of these devices are designed to distinguish and count a large number of complex events. Further, standard electronic instruments are very cumbersome to use and often require the attachment of a large number of test probes to the computer system whose activity is being monitored. While attempts have been made to produce specialized monitoring hardware, as a general rule, such hardware has only been able to distinguish and count a limited number of events. Further, it has been awkward to use.

Examples of previously developed software and hardware computer monitoring systems are described in U.S. Pat. No. 4,484,269 entitled "Apparatus for Providing Measurement of Central Processing Unit Activity," U.S. Pat. No. 4,485,440 entitled "Central Processor Utilization Monitor" and U.S. Pat. No. 4,590,550 entitled "Internally Distributed Monitoring System."

The present invention is directed to overcoming the foregoing disadvantages by providing a software-controlled bus event monitor that includes specialized hardware components designed to count a large number of different events that occur on the bus of a computer system without degrading the operation of the system.

SUMMARY OF THE INVENTION

In accordance with this invention, a monitor for monitoring the occurrence of events on the bus of a multiprocessor system is provided. The bus event monitor (BEM) includes a dedicated control processor and an event counter subsystem coupled to the bus. During each bus cycle, the BEM captures and interprets the packet of data being transmitted on the bus. If the bus packet represents an event designated by the user to be of interest, an event counter associated with the type of packet that was captured and interpreted is incremented by one. More specifically, in accordance with the invention, a field programmable gate array (FPGA), configured by the user, defines the type of events to be counted. When an event to be counted occurs, the FPGA produces a counter address that is based on the nature of the event, and causes an enable pulse to be generated. The address is applied to the active one of two event counter banks via a crossbar switch. The enable pulse causes the addressed counter to be incremented by one. The inactive counter bank is available for reading by the BEM dedicated control processor while the counters of the active counter bank are being incremented. The counter banks can be interchanged without data being lost. Preferably, each counter bank contains a large number of counters (e.g., 64K) each having a large capacity (e.g., 32 bit). As a result, a large number of events can be counted over an indefinitely long period of time.

In accordance with further aspects of this invention, the BEM dedicated control processor is controlled by a program stored in a reserved portion of the system under test's (SUT's) memory. In addition to the BEM dedicated processor control program, the reserved portion of the memory also stores the program's stack area, and a communications header and communications buffer areas. The BEM dedicated processor control program coacts with a BEM operating program that runs as a privileged task under the SUT's operating system. The BEM operating program includes subroutines that boot the dedicated BEM processor, as well as interpret a user-written BEM script file and cause its execution by passing lower-level commands to the dedicated processor control program.

In accordance with further aspects of this invention, before using the BEM, a user creates an experiment-specific FPGA configuration file and the previously mentioned script file. The FPGA configuration file specifies the events to be counted. The script file causes the BEM hardware to be initialized, loads the FPGA configuration file, sets experiment parameters and controls the collection of count data.

In accordance with other aspects of this invention, the large number of event counters comprises a combination of fast static random access memories (SRAMs) and an incrementer. Each location in the SRAM stores an independent counter value. When a counter value is to be incremented, it is selected by a unique address, its value read, the value incremented by one (1) by the incrementer, and the update counter value written to the addressed location. The high density of available SRAMs provides an efficient way of implementing a large number of event counters.

In accordance with still further aspects of this invention, input and output crossbar switches are added to the two event counter memories and an incrementer to create a two bank event counter subsystem. A two bank event counter subsystem allows events to be counted in one bank (the "active" bank) while results are simultaneously being read from the other bank. If the crossbar switches are switched synchronously with respect to the bus event addresses formed by the FPGA, event counter banks can be interchanged without the loss of any event counts. Given that each event counter is sufficiently large to count all possible events without overflow during the time it takes to read the inactive event counter bank, event count data can be collected for an indefinitely long period without any bus event count information being lost.

In accordance with still another aspect of this invention, the event counter subsystem incorporates a control and status register which controls the input and output crossbar switches to determine which event counter bank is active and inactive, plus further qualification of the FPGA event counter enable pulse. This later feature is provided to allow the BEM script (via the BEM operating system and BEM dedicated control program) to precisely control the interval during which bus events are counted.

As will be readily appreciated from the foregoing description, a bus event monitor formed in accordance with the invention accurately measures the internal activity of a running computer system. Accurate measurement is provided by counting each internal bus operation a computer system makes while working on a problem. Monitoring is done in a passive manner that does not impinge on and, thus, degrade the operation of the computer system. The number of events counted can be read at regular intervals without interrupting the monitoring operation of the bus event monitor due to the use of two counter banks, either of which can be incremented while the other is being read.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

As will be better understood from the following description, a bus event monitor (BEM) formed in accordance with the invention is a programmable bus monitoring device that passively listens to system bus activity and counts the occurrence of specified bus events. The output provided by the BEM is useful for performance measurements, such as analyzing memory access patterns, analyzing the uses of shared memory, determining patterns in the acquisition and resolution of memory locks, measuring memory access time and interrupt latency, etc. During each bus cycle, the BEM captures and interprets the packet of data being transmitted on the bus. If the bus packet represents an event designated by the user to be of interest, a specific event counter associated with the type of packet that was captured and interpreted is incremented by one. A bus event monitor formed in accordance with the invention includes a large number of large capacity event counters. As a result, a large number of different bus events can be counted. The bus events to be counted are determined by the way a user configures a field programmable gate array. In order to avoid loss of data, data can be stored in either of two counter banks, depending upon the setting of input and output crossbar switches. The inactive of the two counter banks is available for data readout while the active counter bank continues to receive and store data.

Figure 1:
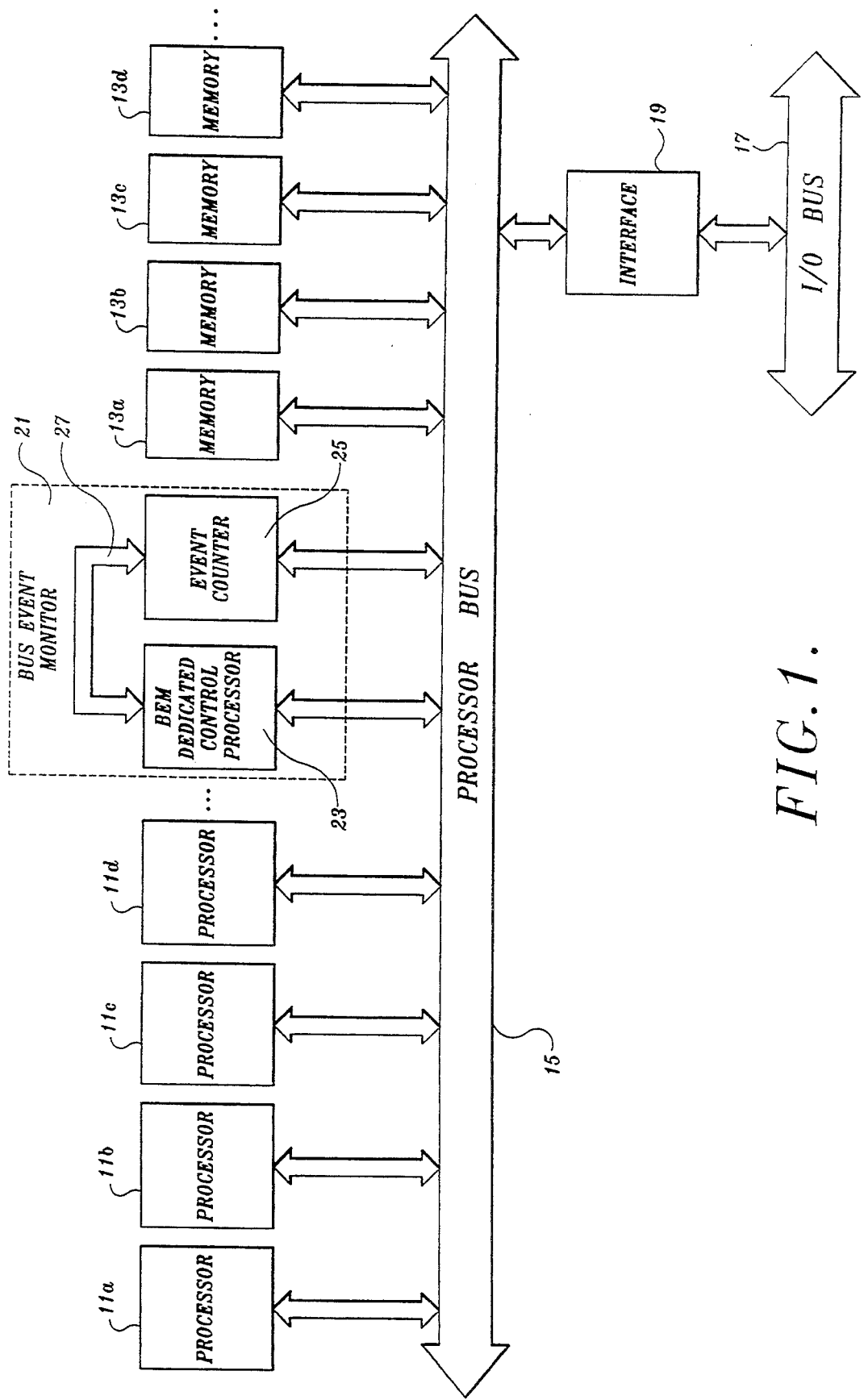
FIG. 1 is a block diagram of a multiprocessor data processing system including a bus event monitor (BEM) formed in accordance with the invention.

FIG. 1 is a block diagram illustrating a multiprocessor data processing system with which the invention is useful. More specifically, FIG. 1 comprises a plurality of shared processors 11a, 11b, 11e, 11d . . . and a plurality of memory modules 13a, 13b, 13c, 13d . . . . The shared processors 11a, 11b, 11e, 11d . . . and the memory modules 13a, 13b, 13e, 13d . . . are interconnected via a processor bus 15. The processor bus 15 is coupled to an input/output (I/O) bus 17 via a suitable interface 19. The I/O bus connects the shared processors and the memory to necessary peripheral devices, such as a console, printers, large capacity permanent storage devices, etc.

Also included in the distributed processing system illustrated in FIG. 1 is a bus event monitor (BEM) 21 formed in accordance with this invention. The BEM 21 includes a BEM dedicated control processor 23 and an event counter subsystem 25. The BEM dedicated control processor is coupled to the processor bus 15 as is the event counter subsystem 25. An event monitor bus 27 couples the BEM dedicated control processor 23 to the event counter subsystem 25.

As will be appreciated from viewing FIG. 1 and the foregoing description, the BEM 21 can be installed like any other computer system module attached to the processor bus 15. As a result, no additional electrical connections are required. As will be better understood from the following description, the BEM passively listens to all bus transactions. A snapshot of each data packet flowing on the computer bus is taken by the BEM and used to determine whether a particular data packet, i.e., bus event, should be counted. If the event is to be counted, the address of a counter that forms a portion of the event counter subsystem 25 is produced, the counter value is read, incremented by one and the incremented value returned to the same counter. As required, the BEM dedicated control processor reads the event counters and the information is used to produce a report detailing the number of events of interest that have been counted.

Figure 2:
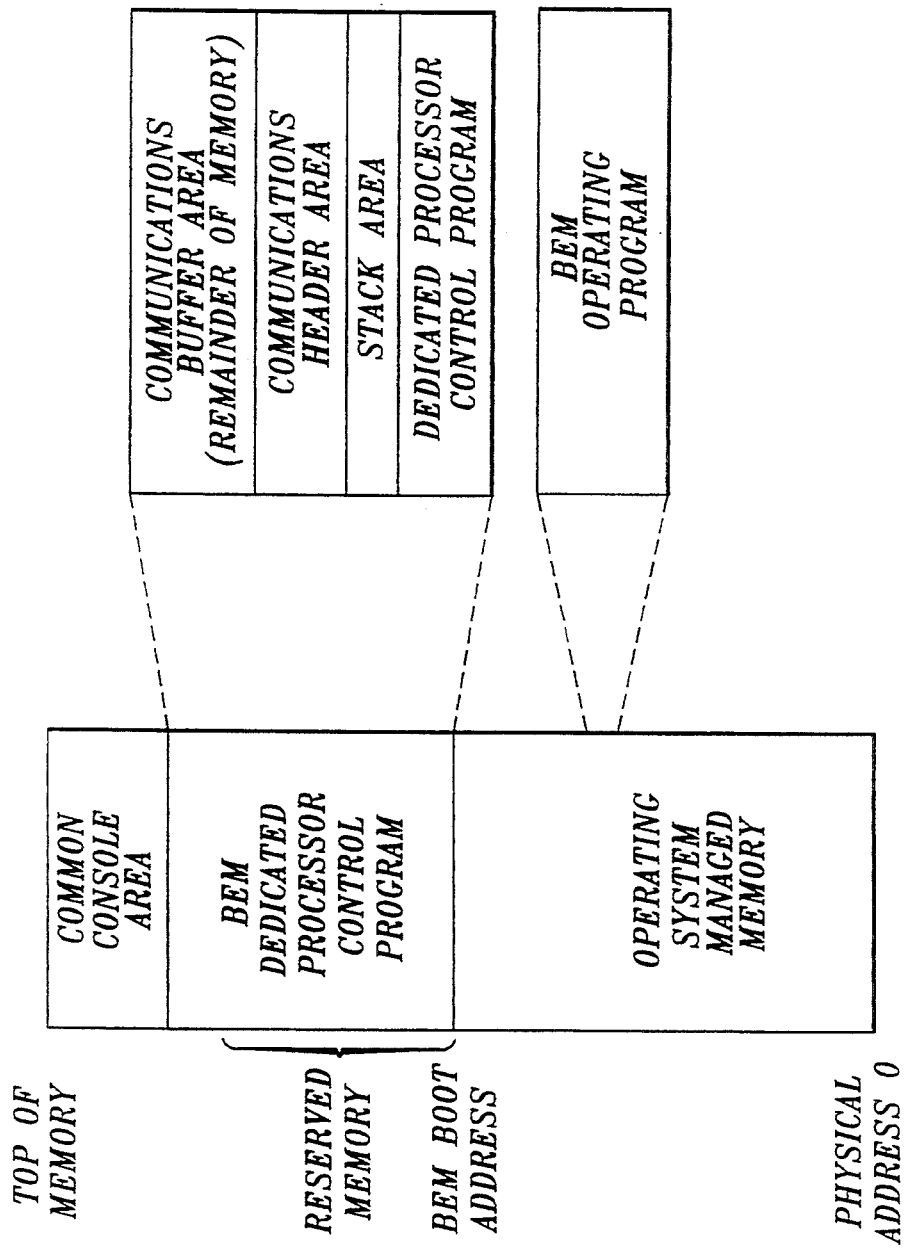
FIG. 2 is a memory map that depicts the main portions of a program suitable for controlling the operation of the bus event monitor illustrated in FIG. 1 and their location vis-a-vis the operating system program.

FIG. 2 is a pictorial diagram of a system memory map suitable for use in controlling a multiprocessor system of the type illustrated in FIG. 1. Starting at physical address zero, the first portion of the memory is the operating system managed memory, which stores the operating system of the system under test (SUT), i.e., the program that controls or manages the operation of the shared processors 11a, 11b, 11c, 11d . . . , the memory modules 13a, 13b, 13c, 13d . . . , as well as other standard multiprocessor system hardware, none of which are illustrated and described since they do not form a part of the present invention. The operating system managed memory also includes tasks that run under the operating system. As shown in FIG. 2, one of these tasks is a BEM operating program.

Following the operating system managed portion of the memory is the boot address of the BEM dedicated processor control program, followed by a reserved memory region in which the BEM dedicated processor control program is stored. In one specific multiprocessor system with which the invention is useful, the remainder of the memory stores the program that controls the common console of the distributed data processing system. The BEM dedicated processor control program reserved memory region may contain several subareas, as dictated by the specific nature of the chosen program. An example taken from an actual embodiment of the invention is illustrated on the right side of FIG. 2. The illustrated example includes an area where the BEM dedicated processor control program is stored, a stack area, an area where communications headers are stored and a communications buffer area. The communications header area includes headers for various communications programs for communicating with the BEM dedicated control processor, with the BEM operating program and with the common console.

In summary, when implemented in the manner illustrated in FIG. 2, during installation of the operating system, a region of memory is reserved for the BEM dedicated processor control program. The system is configured so that the BEM dedicated control processor 23 is not booted for use by the operating system. Rather, the BEM dedicated control processor is separately booted and operated independently of the shared processors 11a, 11b, 11c, 11d . . . .

Figure 3:
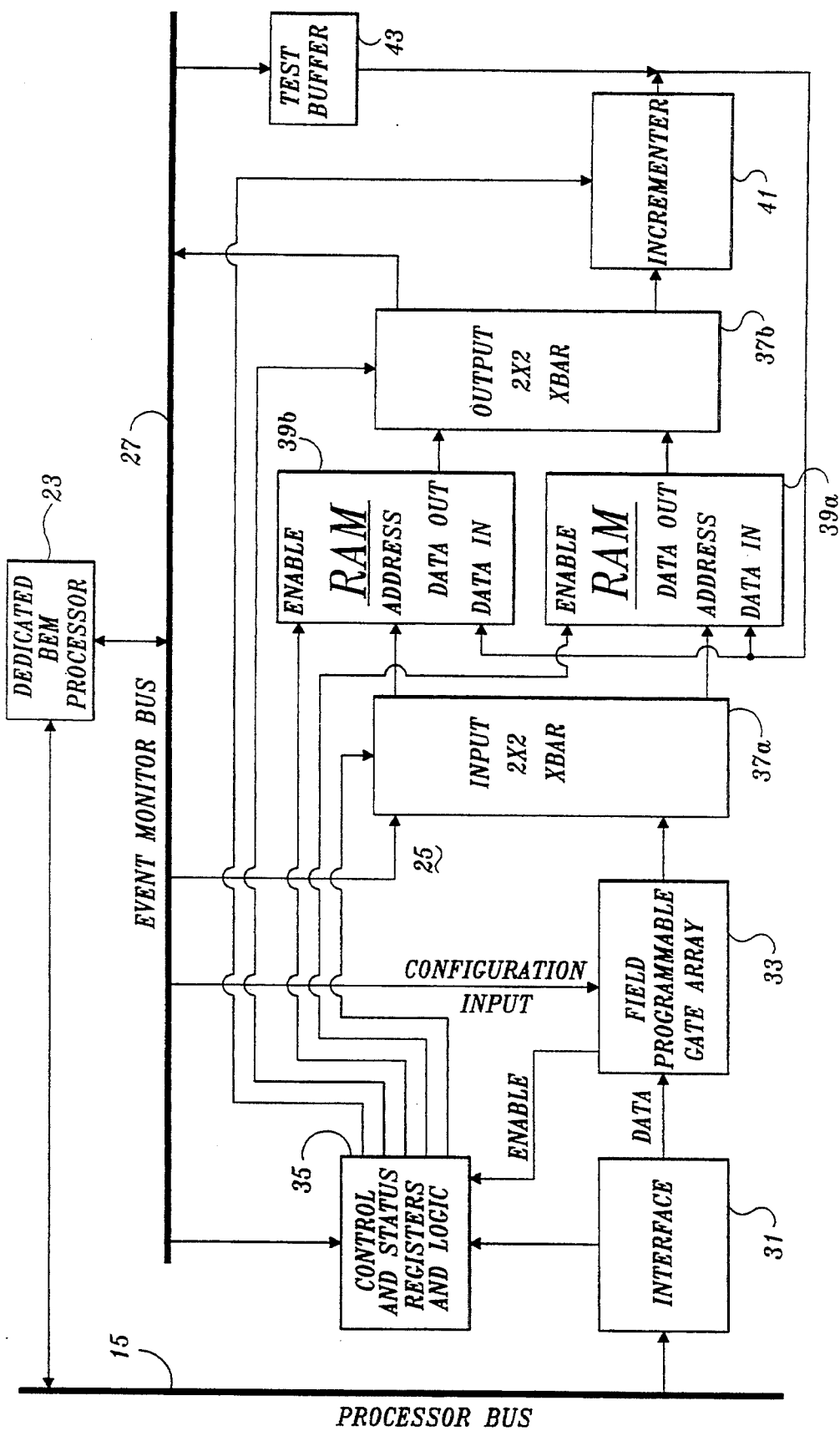
FIG. 3 is a block diagram of a bus event monitor formed in accordance with the invention and suitable for use in the multiprocessor data processing system illustrated in FIG. 1.

FIG. 3 is a block diagram of the hardware portion of a bus event monitor (BEM) 21 formed in accordance with the invention. In addition to the BEM dedicated control processor 23, FIG. 3 illustrates the major hardware components of the event counter subsystem 25. The illustrated components of the event counter subsystem 25 include: an interface 31; a field programmable gate array (FPGA) 33; control and status registers and logic 35; input and output 2×2 (two-by-two) crossbar switches 37a and 37b; two random access memories (RAMs) 39a and 39b; an incrementer 41; and a test buffer 43. The RAMs 39a and 39b are configured to form a large number of large capacity counters. Thus, each RAM forms a counter bank.

Like FIG. 1, FIG. 3 illustrates that the BEM dedicated control processor 23 is coupled to both the processor bus 15 and the event monitor bus 27. The interface 31 interfaces the FPGA 33 to the processor bus. The interface 31 is also coupled to the control and status registers and logic 35. The control and status registers and logic are also coupled to the event monitor bus 27. The control and status registers and logic are configurable by the BEM dedicated control processor via the event monitor bus.

The FPGA 33 produces an enable signal that is applied to the control and status registers and logic 35 when a bus packet detected by the interface 31 represent an event of interest. The configuration input of the FPGA 33 is connected to the event monitor bus 27. The data output of the FPGA 33 is connected to one data input of the input 2×2 crossbar switch 37a. The second data input of the input 2×2 crossbar switch 37a is connected to the event monitor bus 37. The control input of the input 2×2 crossbar switch 37a is connected to an output of the control and status registers and logic.

One output of the input 2×2 crossbar switch 37a is connected to the address input of the first RAM 39a and the second output of the input 2×2 crossbar switch 37a is connected to the address input of the second RAM 39b. The data outputs of the first and second RAMs 39a and 39b are each connected to one of the data inputs of the output 2×2 crossbar switch 37b. One of the outputs of the output 2×2 crossbar switch 37b is connected to the event monitor bus 27 and the other output of the output 2×2 crossbar switch 37b is connected to the input of the incrementer 41. The control input of the output 2×2 crossbar switch is connected to an output of the control and status registers and logic 35. The enable inputs of the first and second RAMs 39a and 39b are each connected to an output of the control and status registers and logic 35.

The final output of the control and status registers and logic 35 is connected to a control input of the incrementer 41. The input of the test buffer 43 is connected to the event monitor bus 27. The output of the test buffer 43 and the output of the incrementer 41 are connected to the data inputs of the first and second RAMs 39a and 39b.

As noted above, the interface 31 interfaces the processor bus 15 to the FPGA 33. As a result, the FPGA monitors all of the packets of data being transmitted on the bus. As described further below, the FPGA is configured to recognize packets of data relating to events of interest to the user. Each time an event of interest occurs, an enable pulse is applied to the control and status registers and logic. At the same time, the FPGA creates the address of a RAM event counter associated with the "captured" event. Which one of the two RAMs 39a and 39b is addressed is determined by the state of a control signal applied to the input 2×2 crossbar switch by the control and status registers and logic. Subsequent to the receipt of the enable signal from the FPGA 33, the control and status registers and logic enables the appropriate RAM 39a or 39b to respond to the address created by the FPGA 33. The count stored in the enabled and addressed RAM counter is stored in an output register that forms part of the enabled RAM. The count stored in the output register is thusly made available to the incrementer 41 via the output 2×2 crossbar switch 39b. Thereafter, the incrementer is enabled. Where enabled, the incrementer increments the stored count value and the resulting incremented count is rewritten back into the same counter, i.e., the counter identified by the address associated with the captured event.

Only one RAM at a time is available to have its counters incremented as events of interest are captured. The other RAM is available to be read by the BEM dedicated control processor 23. This is accomplished by the dedicated BEM processor causing the control and status registers and logic to enable the "inactive" RAM as addresses are generated by the dedicated BEM processor 23. The addressed RAM counter values are applied to the event monitor bus 27 via the output 2×2 crossbar switch 37b. Counter value initialization and testing is accomplished by the control and status registers and logic disabling the incrementer 41 and the dedicated BEM processor applying count values to the test buffer 43. The count values are written into the counters of one of the RAMs 39a or 39b, based upon which RAM is enabled by the control and status registers and logic 35, the address created by the BEM dedicated control processor 23 and the state of the input 2×2 crossbar switch 37a.

In essence, the 2×2 crossbar switches are multiplexers that have two inputs and two outputs. Which input is connected to which output is dependent upon the state of a control bit applied to the 2×2 crossbar switches by the control and status registers and logic 35. That is, either input can be connected to either output depending on the state of the control bit. Preferably, each 2×2 crossbar switch includes two two-input multiplexers connected to the two outputs and controlled such that the multiplexers are always in opposite states, i.e., when input one of the first multiplexer is connected to output one of the 2×2 crossbar switch, input two of the second multiplexer is connected to output two of the 2×2 crossbar switch, and vice versa.

Preferably, each RAM contains a large number of counters-64K, for example, each having a relatively large capacity-a 32-bit, for examples. As long as an event counter bank is read before its event counters can possibly wrap around (232 bus events, or approximately 4 minutes, 35 seconds in one actual embodiment of the invention), the additional counts since the last event counter can be simply and unambiguously determined. The event counters are not reset upon reading; instead the BEM software remembers the last event counter bank values read, and calculates the difference between the old and new event counter values.

While various types of field programmable gate arrays (FPGAs) can be utilized, preferably the chosen FPGA will be relatively large. A suitable FPGA is the XC3090 available from Xilinx, Inc., San Jose, Calif. 95124. The XC3090 has in excess of 4500 gates. The bus events counted by the BEM are specified by a configuration file, which is created by the FPGA design system. The creation of the configuration file, which may be a complex task, is based on the understanding of the FPGA design system, which is not described here since it does not form a part of the present invention. This information is readily available through FPGA documentation available to purchasers of FPGAs, such as the XC3090.

Figure 4:
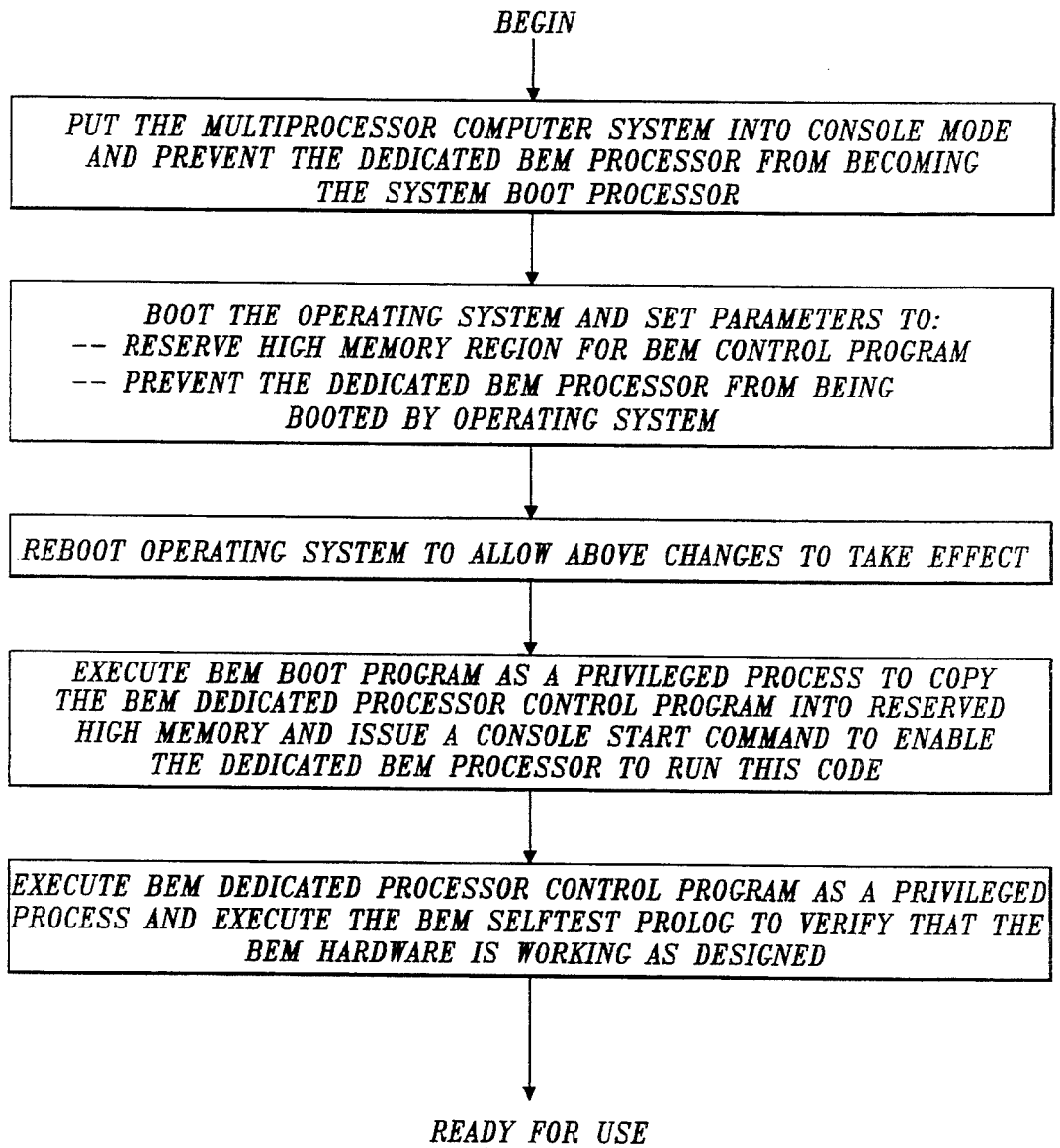
FIG. 4 is a flow diagram illustrating how a dedicated control processor program of the type illustrated in FIG. 2 is booted to control the bus event monitor processor illustrated in FIG. 3.

FIG. 4 is a flow diagram illustrating the installation of the BEM processor into a distributed data processing system of the type illustrated in FIG. 1. The first step is to put the multiprocessor computer system into a console mode of operation. Thereafter, the dedicated BEM processor is prevented from becoming the system boot processor. Next, the operating system is booted and parameters are set to: (1) reserve the high memory region (FIG. 2) for the BEM dedicated processor control program; and (2) prevent the dedicated BEM processor from being booted by the operating system. Thereafter, the operating system is rebooted to allow the foregoing changes to take effect. Next, the BEM boot code is executed as a privileged operating system task. The boot code copies the BEM dedicated control program into the reserved high memory illustrated in FIG. 2, and issues a console start command to the BEM dedicated control processor, causing it to start execution of the BEM dedicated control program. Next, the BEM operating program is executed as a privileged process. Preferably, the first thing the BEM operating program does is execute a BEM self-test script to verify that the BEM hardware is operating as designed. In essence, this involves causing a known, unique pattern of bus events while monitoring the bus with the BEM, and verifying that the BEM event counters accurately recorded the test bus events. Thereafter, the BEM is ready for use.

Figure 5A:
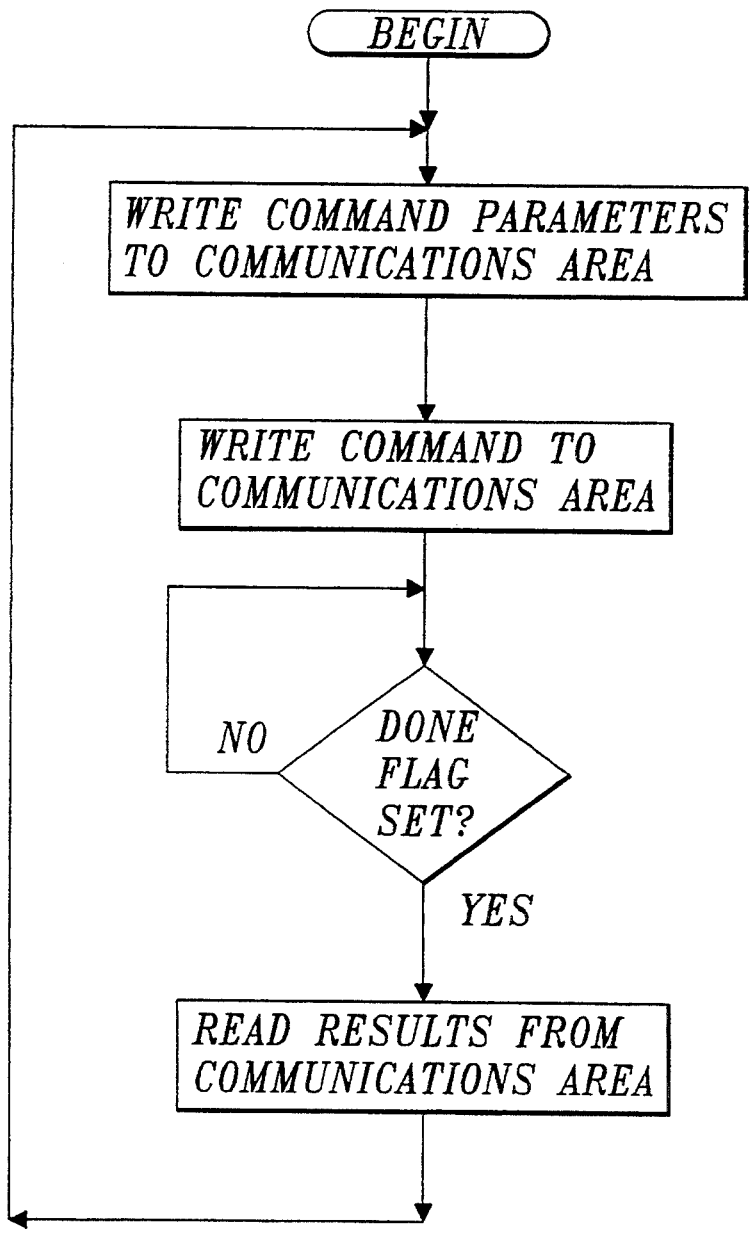
FIGS. 5A and 5B are interactive flow diagrams that illustrate the interaction between the BEM operating program and the dedicated processor control program.
Figure 5B:
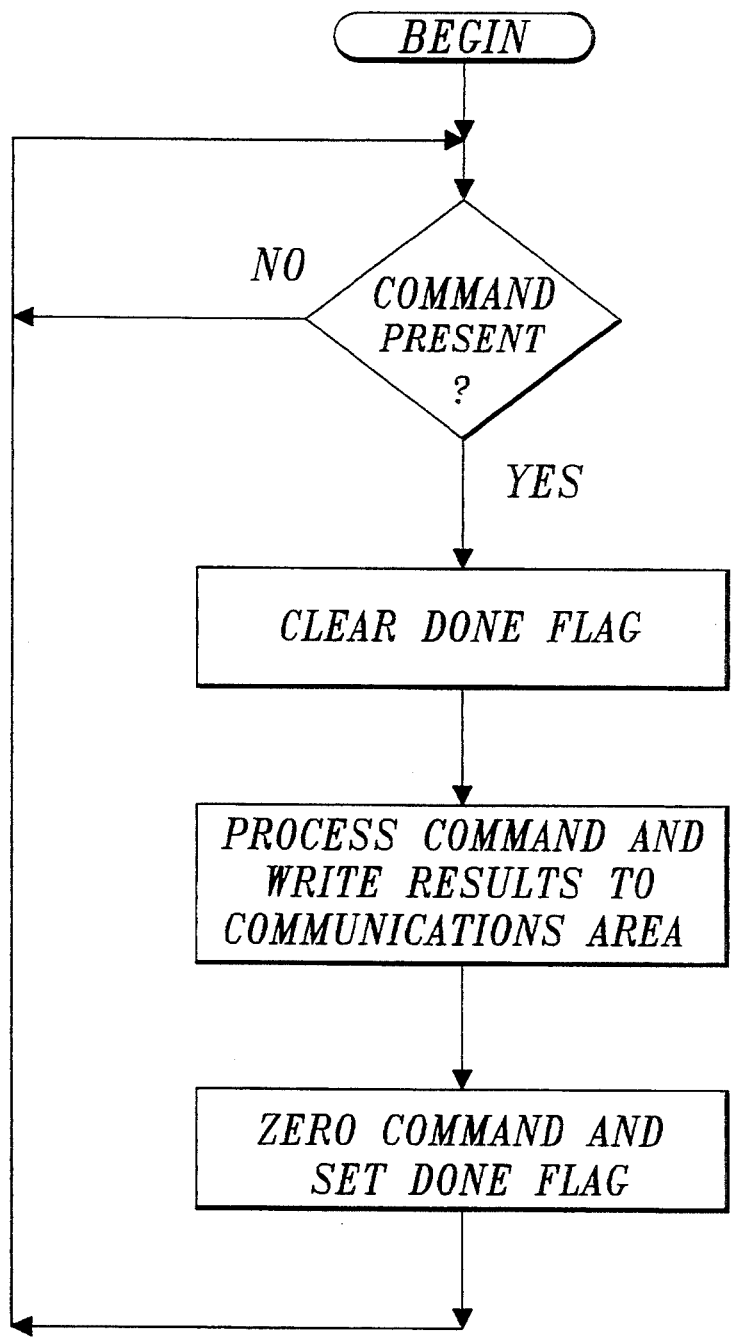

FIGS. 5A and 5B are flow diagrams that illustrate what occurs when the BEM program is run. These flow diagrams are described together because they interact with one another. As shown in FIG. 5A, the BEM operating system program interprets the user-written BEM script and writes command parameters and commands to the communication area (FIG. 2). As shown in FIG. 5B, the BEM dedicated control program continuously monitors the communications area and carries out commands when they are present. Specifically, after command parameters and commands have been written to the communications program, the BEM operating program idles until the commands are carried out. When commands are not available, the BEM dedicated processor control program idles. More specifically, the first step in the BEM operating program (FIG. 5A) is to write the next set of command parameters in the program to the communications area. Thereafter, the related command is written to the communications area. Then, the BEM operating program idles. The idling is accomplished by periodically, e.g., once every 0.1 seconds, testing a "done flag" to determine if it is set. As described below, the done flag is set when the command has been processed and the results thereof written into the communications area. As long as the done flag is not set, the BEM operating program idles. After the done flag has been set, the results of the command are read from the communication area and stored. Thereafter, the next command parameters are written to the communications area, followed by the command being written to the communications area, etc.

As illustrated in FIG. 5B, the first step in the BEM dedicated processor control program is a test to determine whether or not commands are present in the communications area. If no commands are present, the test is repeated. If commands are present, the done flag is cleared. Next, the commands are processed and the results written to the communications area. Thereafter, the command flag is zeroed and the done flag is set. Then, the BEM dedicated processor control program returns to the point where the command flag is tested to determine if it is zero.

In summary, after the BEM dedicated processor control program is booted, the BEM operating program reads user-written script appropriate to the data being collected, and posts a sequence of commands as appropriate to the execution of the script file commands to the BEM communications area. The dedicated processor control program executes the posted commands, sends the results to the communications area of the BEM program memory and sets a done flag. Preferably, the commands used to boot and run the BEM dedicated processor control program and the BEM operating program are specified as logical names in a script file, which simplifies use of the bus event monitor and reduces the chance of accidental memory violations. Both the BEM operating program and the dedicated processor control program use simple polling to determine when the other is finished. Preferably, polling is limited to occur only once every predetermined interval, such as 100 milliseconds, in order to minimize impact on the system under test.

As noted above, preferably, each RAM event counter module consists of a large number (64K) of relatively large (32 bit) counters that are addressed based on the nature of the bus packets as they are evaluated. Each bus cycle, a relatively large (e.g., 16 bit) counter address and a counter enable signal are calculated as a programmable function of the current bus packet. If the counter enable signal is true, meaning that the bus packet represents an event to be counted, the 16-bit encoded address is used to select one of the 64K, 32-bit RAM locations whose contents is read, incremented and rewritten.

The use of two bus event count modules allows continuous counting; that is, the "active" counter bank can be counting events while the "idle" bank is being asynchronously read by the dedicated BEM processor. Active and inactive counter banks can be synchronously exchanged so that counting of bus events can continue indefinitely with no lost events occurring. The 32-bit counter size ensures that the idle bank can be completely read and processed before the active counter bank can overflow. If, for example, the bus cycle time is 64 ns, it takes approximately four minutes and 35 seconds (64 ns$\times 2^{32}$) to cause a counter of the active counter bank to overflow.

While a preferred embodiment of the invention has been illustrated and described, it will be appreciated that, within the scope of the appended claims, various changes can be made therein without departing from the spirit and scope of the invention.

The embodiments of the invention in which an exclusive property or privilege is claimed are defined as follows:

1. A bus event monitor for monitoring the occurrence of events on a computer system bus, said bus event monitor comprising;
   a dedicated bus event monitor processor capable of being coupled to a computer system bus, said computer system bus for transmitting packets having a plurality of different types corresponding to a plurality of different events;
   an event counter subsystem coupled to said dedicated bus event monitor and capable of being coupled to said computer system bus, said event counter subsystem including:
   (i) programmable means, programmable by said dedicated bus event monitor processor, for selecting a subset of said plurality of different types of packets for monitoring by said dedicated bus event monitor;
   (ii) means for interpreting said packets transmitted on said computer system bus to determine if the type of each of said transmitted packets is one of said selected subset of different types of packets, and for producing an address that is unique to said type of each of said packets when one of said plurality of interpreted data packets represent one of said plurality of events of interest;
   (iii) a first plurality of addressable counters, each of said addressable counters corresponding to one of said selected different types of packets for storing count information of said corresponding type of packet, said first plurality of addressable counters coupled to said programmable means such that a specific counter is accessed when a corresponding address is produced by said programmable means;
   (iv) incrementing means coupled to said first plurality of addressable counters for incrementing specific counters each time their corresponding address is produced by said programmable means; and (v) a second plurality of addressable counters corresponding to said first plurality of addressable counters and for storing count information of said corresponding selected type of packet, said second plurality of addressable counters coupled to said programmable means such that a specific counter is accessed when a corresponding address is produced by said programmable means.

2. The bus event monitor claimed in claim 1, wherein said programmable means comprises a field programmable gate array.

3. The bus event monitor claimed in claim 1, including an input crossbar switch for coupling said programmable means to either said first or said second plurality of addressable counters such that addresses produced by said programmable means are only applied to one of said bank of addressable counters at any time.

4. The bus event monitor claimed in claim 3, wherein said programmable means comprises a field programmable gate array.

5. The bus event monitor claimed in claim 3, including an output crossbar switch coupled to said first and second plurality of addressable counters such that the counters of only one of said first and second plurality of addressable counters are incremented by said incrementing means at any time.

6. The bus event monitor claimed in claim 5, wherein said programmable means comprises a field programmable gate array.

7. The bus event monitor claimed in claim 5, wherein said first and second banks of addressable counters are formed by random access memories.

8. The bus event monitor claimed in claim 7, wherein said programmable means comprises a field programmable gate array.

9. A bus event monitor for monitoring the occurrence of events on a processor bus, said bus event monitor comprising;
   a dedicated bus event monitor processor coupled to said processor bus, said processor bus for transmitting packets having a plurality of different types corresponding to a plurality of different events;
   an event counter subsystem coupled to said dedicated bus event monitor processor and to said processor bus, said event counter subsystem including:
   (i) programable means, programmed by said dedicated bus event monitor processor, for selecting a subset of said plurality of different types of packets for monitoring by said dedicated bus event monitor;
   (ii) means for interpreting each of said packets transmitted on said processor bus to determine if the type of each of said transmitted packets is one of said selected subset of different types of packets, and producing an address that is unique to said type of each of said packets when one of said plurality of interpreted packets represent one of said plurality of events of interest;
   (iii) a first plurality of addressable counters coupled to said programmable means such that a specific counter is accessed when a corresponding address is produced by said programmable means;
   (iv) incrementing means coupled to said first plurality of addressable counters for incrementing the counter that is accessed each time a specific counter is accessed when a corresponding address is produced by said programmable means; and (v) a second plurality of addressable counters corresponding to said first plurality of addressable counters such that each addressable counter of said second plurality is accessed using said specific address of said addressable counter of said first plurality, said second plurality of addressable counters being coupled to said programmable means such that a specific counter is accessed when a corresponding address is produced by said programmable means.

10. The bus event monitor of claim 9, wherein said programmable means comprises a field programmable gate array.

11. The bus event monitor of claim 10, including an input crossbar switch for coupling said programmable means to either said first or said second plurality of addressable counters such that addresses produced by said programmable means are only applied to one of said bank of addressable counters at any time.

12. The bus event monitor of claim 11, including an output crossbar switch coupled to said first and second plurality of addressable counters such that the counters of only one of said first and second plurality of addressable counters are incremented by said incrementing means at any time.

* * * * *